(No Model.) 2 Sheets—Sheet 1.

E. F. TURNER.
PROCESS OF TREATING ARGENTIFEROUS SULFID ORES.

No. 587,128. Patented July 27, 1897.

Witnesses:

Inventor,
Ernest Frederick Turner.
By
Attorney.

(No Model.) 2 Sheets—Sheet 2.

E. F. TURNER.
PROCESS OF TREATING ARGENTIFEROUS SULFID ORES.

No. 587,128. Patented July 27, 1897.

Witnesses
Inventor: Ernest Fredrick Turner

UNITED STATES PATENT OFFICE.

ERNEST FREDERICK TURNER, OF ADELAIDE, SOUTH AUSTRALIA.

PROCESS OF TREATING ARGENTIFEROUS SULFID ORES.

SPECIFICATION forming part of Letters Patent No. 587,128, dated July 27, 1897.

Application filed August 6, 1896. Serial No. 601,895. (No specimens.)

*To all whom it may concern:*

Be it known that I, ERNEST FREDERICK TURNER, analytical chemist, a subject of the Queen of Great Britain, residing at the Adelaide University, Adelaide, in the Province of South Australia, have invented an Improved Regenerative Process for the Treatment of Argentiferous Sulfid Ores, of which the following is a full, clear, and exact description.

My invention relates to the treatment of argentiferous sulfid ores, and more particularly zinkiferous sulfid ores, galena, and argentiferous galena containing gold and other metals. It has for its object the extraction of the several metallic contents, together with the utilization of certain products of the process for the regeneration of the materials employed therein and for the obtaining of certain by-products of commercial value.

In my invention the raw sulfid ore is disintegrated by the action of hydrochloric acid, (HCl,) resulting in the formation of metallic chlorids, which are subsequently fused and the metals recovered, and in the production of sulfureted hydrogen, ($H_2S$,) which is used as fuel and the products of its combustion utilized for the production of fresh supplies of HCl. From the $H_2S$ so produced not only are fresh supplies of HCl obtained during the process by the treatment of sodium chlorid with the sulfur dioxid ($SO_2$) resulting from the use of the $H_2S$ as fuel, but also from the sodium chlorid certain by-products in the form of caustic soda and other soda products. Portions of such products are used for the recovery of the metals from the aqueous chlorids obtained in the first part of the process, and any excess can be dealt with for commercial purposes.

In order that my invention may be fully understood, I propose to explain the same by the accompanying drawings, in which is shown an apparatus for carrying it into effect.

Figure 1:
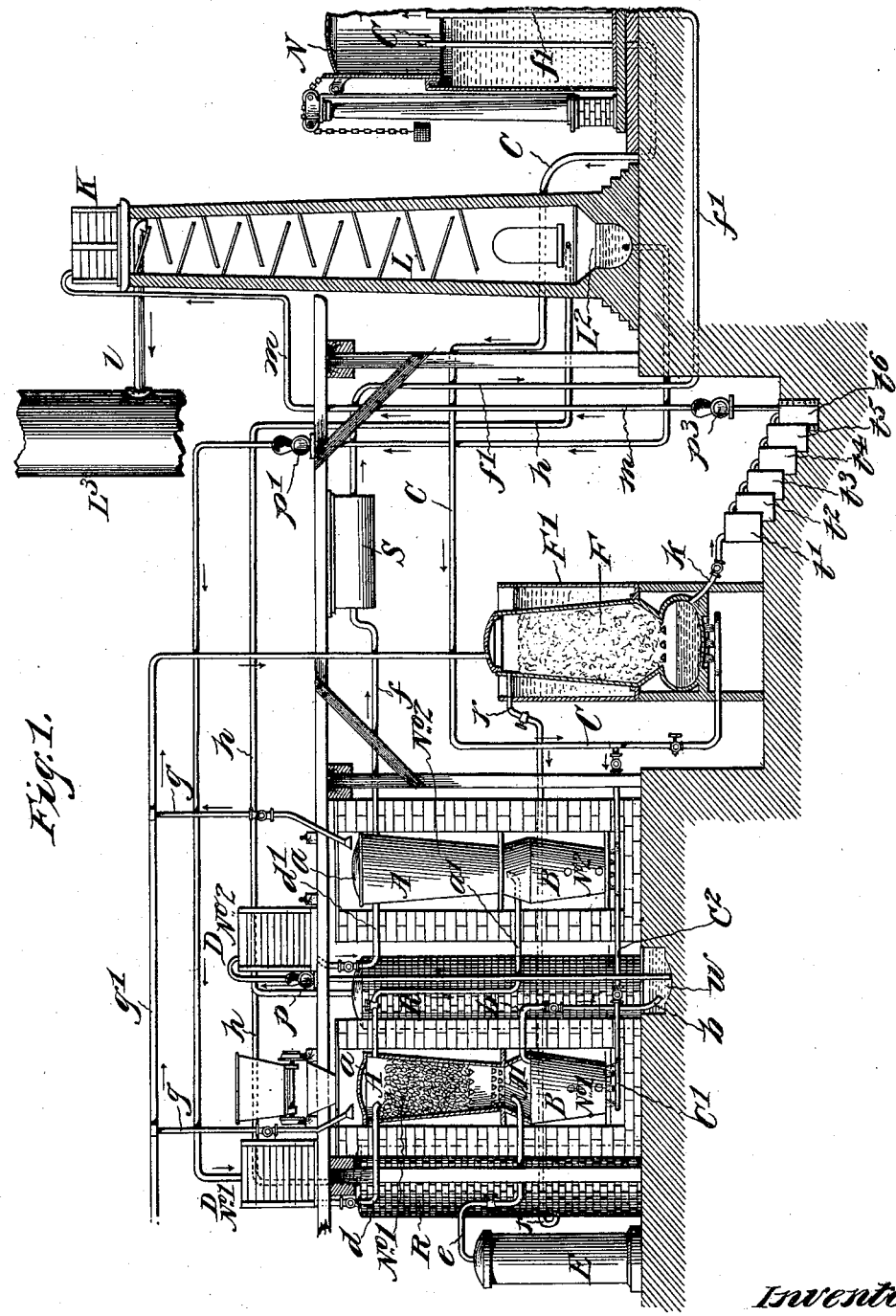
Figure 2:
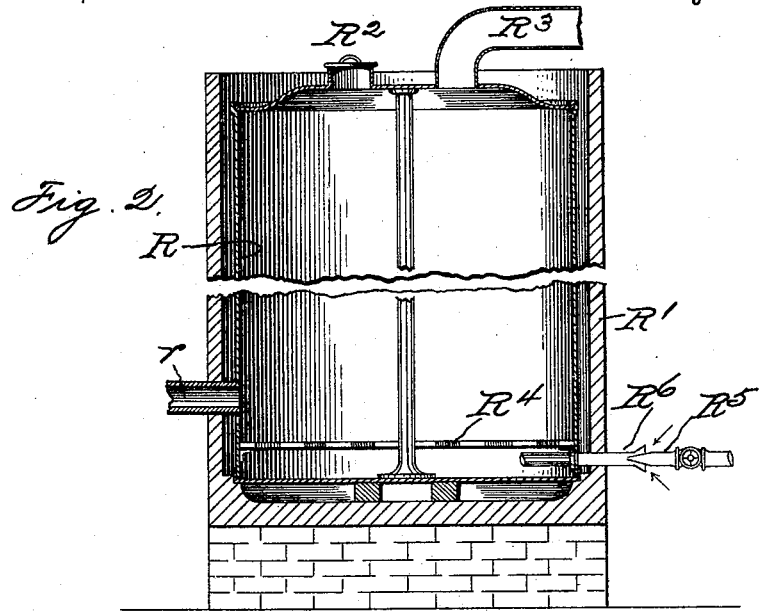
Figures 3, 4:
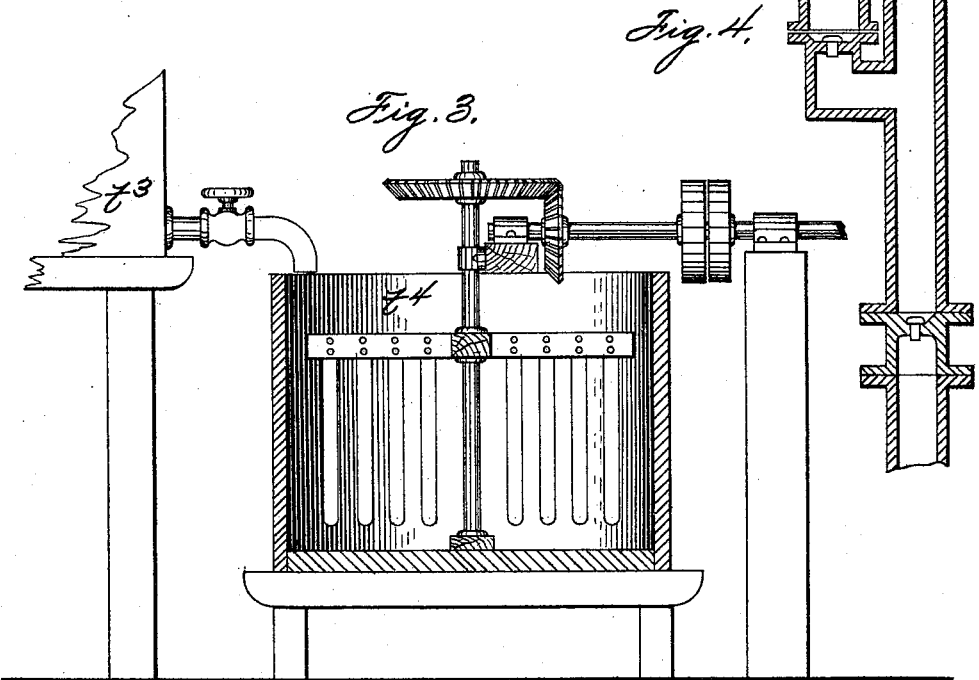

Figure 1 shows the general arrangement of pipes, tanks, &c., necessary for carrying out the process; Fig. 2, a section of one of the tanks R; Fig. 3, a section of the tank $t$; Fig. 4, a section of an ordinary porcelain or earthenware pump that is adapted for pumping the acid liquors.

The sulfid ore as taken from the mine-floors and without reducing it to a finely-divided state is placed in suitable vats or digesters A, lined with copper or other suitable material capable of resisting the action of corrosive acids. These digesters A, with their accompanying appliances, as hereinafter described, are arranged in series of any suitable number and they may be of any suitable size. They are provided with gas-tight lids, and their bottoms are covered with copper gratings A', arranged in three tiers one over the other. The openings in the gratings are graduated, the topmost being the largest, so that only fine particles of ore can pass through the lowest one into a crucible B placed below. These crucibles B are provided with heating apparatus C', which consists, preferably, of gas-jets supplied from a gas-holder N through the pipe C and a branch pipe $C^2$, as hereinafter more particularly described.

The digesters A having been charged with raw sulfid ore and the gas-tight covers $a$ replaced, aqueous HCl is introduced from a storage-tank D No. 1 and sprayed into the upper portions of the digester A No. 1 by means of a spray-pipe $d$, while at the same time HCl gas from a generator E is discharged immediately underneath the copper gratings A' through a pipe $e$. By the combined action of the aqueous and gaseous HCl the ore is gradually disintegrated and passes with the aqueous HCl through the gratings A' into the crucible B. The crucible B No. 1 is constantly heated in order to maintain the aqueous HCl, which now contains metallic chlorids of lead and zinc at the boiling-point.

The digesters A and crucibles B being arranged in series, the aqueous HCl, containing lead and zinc in solution, is discharged from the crucible B No. 1 through a pipe $b$ into a suitable receptacle or well $w$ and raised by any suitable means, as a pump $p$, into the tank D No. 2 of the series, leaving the gangue and any partially-undecomposed ore with the adhering silver chlorid in the crucible. From the tank D No. 2 the acid solution of lead and zinc is sprayed, as before, over the ore in the digester A No. 2 through a pipe $d'$ and is passed in this way from one digester to another until the HCl has become neutralized and a neutral satuated solution of chlorids of lead and zinc obtained. This saturated solution is then returned to the crucible B No. 1 of the series. In the meantime the whole of the ore contents of the digester A have become disintegrated and have passed into the crucible B. The digester A No. 1 is then disconnected, and the digester A No. 2 in the series now becomes the first and the digester A No. 1, when refilled, the last of the series, and so on in turn, the order always changing as each digester is emptied and refilled with supplies of raw ore for treatment.

Having detailed the circulation of the aqueous HCl and its return to crucible B No. 1 in the form of neutralized solution of chlorid of lead and zinc, before detailing its further treatment for the recovery of the metals I will explain the circulation of the gaseous HCl, which flows through copper pipes and copper-lined tanks, or enameled, porcelain-lined, or earthenware tanks may be used.

The gaseous HCl rising through the contents of the digester A No. 1 liberates $H_2S$ by its action upon the sulfids of the ore. The gases so formed in digester A No. 1 are carried by suitable pipe connections $a'$ and are discharged underneath the copper gratings of the digester A No. 2 in the series. After passing through the ore in the digester A No. 2 they pass to the next in the series, and so on until the HCl gas becomes neutralized and the $H_2S$ practically free from HCl. To eliminate any final traces of HCl, the gases are conducted by pipe $f$ through a purifying-chamber S, filled with crushed antimony-blende, and the pure $H^2S$ led by pipe $f'$ into a gas-holder N, of any ordinary construction, for storage purposes. From the gas-holder N the $H_2S$ is drawn for use as fuel whenever required, it being intended that the $H_2S$ so obtained shall be used for all purposes for which heat is required, thereby effecting a considerable saving in fuel. The products of the combustion of the $H_2S$ as fuel, which are sulfur dioxid ($SO_2$) and aqueous vapor mixed with nitrogen from the air, are collected by means of suitable flues $g$, connected with a main $g'$, then passed through drying-towers F for extraction of the aqueous vapor, as hereinafter more particularly referred to, and finally discharged through pipe $r$ and suitable branch pipes into cylinders R, arranged conveniently to the digesters A. The cylinders R, Fig. 2, are filled with briquets of sodium chlorid and are maintained at a temperature of about 500° centigrade, air and steam being admitted thereto by any well-known means. These tanks R are made of iron provided with a tight top, having therein a manhole $R^2$ and a leading-off pipe $R^3$. Near the bottom is a perforated false bottom $R^4$, on which the briquets are placed, and below which is located the injector for introducing air and steam, consisting of the steam-nozzle $R^5$ and cone $R^6$, which operate together in the ordinary manner of injectors. The entire tank has a masonry casing $R'$. By the action of the $SO_2$, together with such air and steam, upon the sodium chlorid in the cylinders R HCl gas is evolved and sodium sulfate or salt cake produced as a residue or by-product. The latter is subsequently removed and heated with carbon in the ordinary way in order to produce sodium sulfid for use in the recovery of zinc, as hereinafter described in a subsequent portion of the process, or converted by any known process into caustic soda and other soda products. The HCl gas from the generating-cylinders R flows through suitable branch pipes to a main $h$, that conducts said gas to the lower end of a tower L, through which a continual stream of brine, obtained in the manner hereinafter described, is being passed from a reservoir K, placed overhead. By the action of the gaseous HCl upon the brine sodium chlorid is precipitated and aqueous HCl produced. The aqueous HCl is collected in a suitable receptacle $L^2$ at the base of the tower L and is forced from this to the aqueous HCl storage-tank D No. 1 by a pump $p'$, for instance, for use in the continuance of the process, the nitrogen which has passed with the gaseous HCl from the cylinders R being meanwhile eliminated by any suitable means, as by connecting the upper end of the tower L with a stack $L^3$ by an exhaust-pipe $l$.

The pumps used are acid-proof pumps of porcelain, enameled ware, or of any other suitable material, Fig. 4 illustrating a pump made of earthenware suitable for the purpose.

Returning to the former portion of the process, the contents of the crucible B No. 1 of the series now consist of disintegrated particles of gangue and undecomposed ore (which may be blende, galena, or argentiferous galena) with which has remained the insoluble silver chlorid and of the concentrated solution of aqueous zinc and lead chlorids which has been returned therein after the circulation, as detailed. The temperature of the mass in the crucible is gradually raised until it reaches about 300° Celsius. The lead and zinc chlorids as the heat rises gradually fuse, and by the action of the fused zinc chlorid the silver chlorid dissolves in the fused mass. The fused mass of chlorids having a specific gravity of about 4, any particles of ore still undecomposed sink to the bottom of the crucible and can be removed later for further treatment. The gangue meanwhile becomes suspended in the fused mass of chlorids, and the whole is removed while still hot to suitable closed drying-towers F. The towers F are preferably placed within a water-tank F', so that the heat evolved by the hygroscopic action of the zinc chlorid may be absorbed by the water, which latter is used as may be required in other parts of the process. Into the upper portion of these drying-towers F the $SO_2$ aqueous vapor and other products of combustion of the H₂S are discharged from the collecting-flues $g'$ $g'$, as before described. The aqueous vapor is then absorbed by and dissolves the soluble metallic chlorids, while at the same time any chlorid of gold in the fused mass is reduced to the metal state by the sulfurous anhydrid. The fused mass (as the chlorids are dissolved by the aqueous vapor) passes through gratings at the bottom of the drying-towers F into a lower chamber, where it is boiled with water acidulated with HCl. The hot aqueous solution of chlorids, together with the gangue, is then drawn off by pipe $k$ into a lixiviating-tank $t'$, which forms the first of a series of precipitating-tanks. As the gangue settles the aqueous chlorids are drawn off into a second or cooling tank $t^2$. The residue of gangue left in the first tank $t'$ is then washed with boiling water until free from lead chlorid. The first tank $t'$ now contains gangue, metallic gold, and silver chlorid, which may be recovered by any well-known means. The liquor drawn off from the first tank $t$, together with the washings, is now placed into a second or cooling tank $t^2$ and the lead chlorid settles out. When the liquor in the second tank $t^2$ has cooled down, the clear liquid is removed to the third tank $t^3$ of the series. In this any remaining traces of lead chlorid are decomposed by means of sodium sulfate obtained from the HCl generators R. Lead sulfate is thus precipitated and the sodium sulfate contained in the solution becomes sodium chlorid. The liquor from this third tank $t^3$ is conveyed to the fourth tank $t^4$ of the series, which in practice will be fitted with a revolving stirring-gear having long rods of metallic zinc, whereby the whole of the copper is precipitated. Fig. 3 is a section of the tank $t^4$, showing the stirring-rods, gearing, and pulleys for actuating the stirrer. The liquor is then removed to the fifth tank $t^5$ in the series, where it is oxidized by any suitable means, as by chlorin, until the ferrous iron is converted into ferric iron, when it is treated with a solution of caustic soda and boiled, which causes the separation of the iron from the zinc, the iron being precipitated as the hydrate is removed from the bottom of the tank, while the zinc remains in solution as the hydrate. By this means the whole of the remaining metallic chlorids are decomposed into hydroxids and the sodium chlorid regenerated.

The liquor which still contains zinc and manganese is aerated, and thereby the manganese is thrown down as manganese dioxid, which can be used in the production of chlorin. The liquor is then removed to the sixth tank $t^6$, wherein the whole of the zinc in the form of zinc sulfid is precipitated by means of sodic sulfid or recovered by any well-known means. This sodium sulfid is obtained by heating with carbon the salt cake or sodium sulfate resulting from the regeneration of the HCl in the cylinders R, as before described.

The zinc sulfid may, if desired, be converted into zinc oxid by roasting for use in any zinc-electrolyzing tank in order to maintain the strength of the solution and to keep it neutral. The liquor in the final tank $t^6$, now only an alkaline brine, is raised by any suitable means, as by pump $p^3$ and pipe connection $m$, into a brine-tank K, placed at the top of a tower L for the production of sodium chlorid and aqueous HCl, as hereinbefore described.

In my invention as detailed herein there are, as will be perceived, three distinct circulations—first, the circulation of the aqueous HCl through the series of digesters containing raw sulfid ore and its return to the first of the series of crucibles in the form of saturated solution of lead and zinc chlorids for the fusion of the silver chlorid in the ore; secondly, the circulation of the gaseous HCl through the several digesters containing crude ore until it also has become neutralized and the H₂S resulting from its action on the sulfids in the ore has, after use as fuel, been returned as SO₂, which by the use of sodium chlorid has been returned to the supply-tanks as HCl, both in a gaseous and aqueous form; thirdly, the circulation of the sodium chlorid, comprising, first, its use in generators for the production of gaseous HCl, then in the lixiviating-tanks in the form of sodium sulfate and caustic soda for precipitation purposes, its subsequent regeneration as sodium chlorid, and final recovery in the aqueous HCl towers for fresh use in the gaseous HCl generators.

In the above description the process is detailed as relating to zinkiferous sulfid ores. In the treatment of galena and argentiferous galena zinc chlorid is first fused in the crucible and the raw ore in a finely-divided state, either alone or preferably mixed with lead sulfate and lead oxid, poured therein. The lead in the ore is reduced and sinks to the bottom of the crucible as metallic lead, whereas the gangue with adhering silver chlorid rises and becomes admixed with the fused chlorid of zinc. The fused mass is then removed for the recovery of the silver and zinc in the manner hereinbefore described and the lead poured off into suitable cakes.

I am well aware that the various parts of my process, either singly or in certain combinations, are well known, and wish it to be well understood that I do not claim as my invention any one of them singly or specifically or any two or more of them together in any combination whatever except in the particular combinations indicated.

Having thus described my invention, what I claim as new therein, and desire to secure by Letters Patent, is—

1. In a process for the extraction of the metal of compound sulfid ores, disintegrating the latter by the combined action of aqueous and gaseous hydrochloric acid, whereby sulfureted hydrogen is produced, passing the acid gases successively through fresh batches of the ore until the hydrochloric acid is neutralized, and utilizing the $H_2S$ as fuel in the process of extraction, substantially as set forth.

2. In a process for the extraction of the metal of compound sulfid ores, disintegrating and decomposing the latter by the combined action of aqueous and gaseous hydrochloric acid, neutralizing the acid gases evolved whereby sulfureted hydrogen is obtained, heating the disintegrated ore by means of such sulfureted hydrogen, collecting the sulfur dioxid resulting from the combustion, bringing this gas into contact with sodium chlorid in presence of heat whereby hydrochloric-acid gas and sodium sulfate are obtained, and utilizing the former in the process of disintegration, substantially as set forth.

3. In a process for the extraction of the metal of compound sulfid ores, disintegrating and decomposing the latter by the combined action of aqueous and gaseous hydrochloric acid, neutralizing the acid gases evolved whereby sulfureted hydrogen is obtained, heating the disintegrated ore by means of such sulfureted hydrogen, collecting the sulfur dioxid resulting from the combustion, bringing this gas into contact with sodium chlorid in presence of heat whereby hydrochloric-acid gas and sodium sulfate are obtained, utilizing the former in the process of disintegration, converting the sodium sulfate into sodium sulfid by means of carbon, and utilizing the same for the extraction of the zinc in the ore and other purposes, substantially as set forth.

4. In a process for the extraction of the metal of compound sulfid ores, disintegrating and decomposing the latter by the combined action of aqueous and gaseous hydrochloric acid, neutralizing the acid gases evolved whereby sulfureted hydrogen is obtained, heating the disintegrated ore by means of such sulfureted hydrogen, collecting the sulfur dioxid resulting from the combustion, bringing this gas into contact with sodium chlorid in presence of heat whereby hydrochloric-acid gas and sodium sulfate are obtained, converting the gas into aqueous hydrochloric acid by means of brine, whereby sodium chlorid is recovered, utilizing the aqueous hydrochloric acid in the process of disintegration of the ore and the sodium chlorid in the production of hydrochloric-acid gas and other purposes, in the process, substantially as set forth.

5. In a process for the extraction of the metal of compound sulfid ores, disintegrating the ore by the combined action of liquid and gaseous hydrochloric acid, converting the liquid portion resulting from this treatment into a neutral saturated solution of lead and zinc chlorids by passing it through successive batches of fresh ore, returning the neutral saturated solution to the solid residues of the process of disintegration, fusing the whole by heat and then extracting the metal separately therefrom, substantially as set forth.

6. In a process for the extraction of the metal of compound sulfid ores, disintegrating the ore by the combined action of liquid and gaseous hydrochloric acid, collecting the disintegrated material, neutralizing the liquid portion thereof by passing the same through fresh batches of ore, whereby a neutral saturated solution of zinc and lead chlorids is obtained, mixing the same with the residuary solid products of disintegration, heating the whole to dissolve the silver chlorid present, subjecting the mass to the action of sulfur dioxid ($SO_2$) to dissolve the soluble chlorids and to reduce any gold chlorid present to a metallic state by the sulfurous anhydrid formed, and finally extracting the metals from the material so treated by well-known means, substantially as set forth.

7. In a process for the extraction of the metal of compound sulfid ores, disintegrating the ore by the combined action of liquid and gaseous hydrochloric acid in the presence of heat derived from the combustion of sulfureted hydrogen, collecting the disintegrated material, neutralizing the liquid portion thereof by passing the same through fresh batches of ore, whereby a neutral saturated solution of zinc and lead chlorids is obtained, mixing this with the solid residues of the process of disintegration, heating the whole to dissolve the silver chlorid present, by heat also derived from the combustion of sulfureted hydrogen, subjecting the mass while still hot to the action of the products of combustion of the $H_2S$, to dissolve the soluble chlorids and reduce any gold chlorid present to a metallic state by the sulfurous anhydrid formed, and finally extracting the metals from the material so treated by well-known means, substantially as set forth.

8. In a process for the extraction of metals from compound sulfid ores, disintegrating and decomposing the latter by chlorination, neutralizing the acid gases evolved whereby sulfureted hydrogen is obtained, collecting the sulfur dioxid resulting from the combustion of the sulfureted hydrogen, in presence of sodium chlorid, steam and air and forming hydrochloric-acid gas and sodium sulfate, converting the gaseous into liquid hydrochloric acid, utilizing the liquid acid for disintegrating the ores and forming solutions of lead zinc and iron chlorids by passing the liquid portions, resulting from the treatment of the ores through successive batches of ore, returning this solution to the solid residues, fusing the mixture and subjecting it to action of the products of combustion of the sulfureted hydrogen which are thereby disintegrated, and boiling it in acidulated water, settling out the solids and drawing off the liquor, washing the solids with boiling water which is drawn off and mixed with the above-mentioned liquor, cooling and separating the lead chlorid from said liquor, precipitating the copper by metallic zinc, oxidizing and separating the iron, aerating and separating the manganese, separating the zinc by means of sodium sulfid and recovering from the final brine the sodium chlorid to be used in a prior stage of the process, substantially as set forth.

In witness whereof I have hereunto set my hand in presence of two witnesses.

ERNEST FREDERICK TURNER.

Witnesses:
SAMUEL JAMES MITCHELL,
JOHN HERBERT COOKE.